United States Patent [19]
Zander

[11] Patent Number: 5,652,933
[45] Date of Patent: Jul. 29, 1997

[54] CAMERA WITH LOCKING DEVICE FOR SECURING FILM WINDER AND FRAME COUNTER AFTER COMPLETED FILM USE

[75] Inventor: Dennis Roland Zander, Penfield, N.Y.

[73] Assignee: Eastman Kodak Company, Rochester, N.Y.

[21] Appl. No.: 597,721

[22] Filed: Feb. 7, 1996

[51] Int. Cl.⁶ ............................................. G03B 1/00
[52] U.S. Cl. ............................................. 396/396
[58] Field of Search ........................ 354/212, 213, 354/214, 215, 217, 218; 396/395, 396

[56] References Cited

U.S. PATENT DOCUMENTS

| | | | |
|---|---|---|---|
| 2,621,866 | 12/1952 | Harvey | 354/217 |
| 3,479,940 | 11/1969 | Nerwin | 354/214 |
| 3,485,157 | 12/1969 | Nerwin | 95/31 |
| 4,251,148 | 2/1981 | Stemme et al. | 354/173 |
| 4,949,111 | 8/1990 | Alligood | 354/213 |
| 4,972,649 | 11/1990 | Mochida et al. | 53/430 |
| 5,005,035 | 4/1991 | Pagano | 354/206 |
| 5,235,366 | 8/1993 | Kucmerowski | 354/212 |

*Primary Examiner*—Safet Metjahic
*Assistant Examiner*—John Chizmar
*Attorney, Agent, or Firm*—Roger A. Fields

[57] ABSTRACT

A camera comprising a film winder rotatable to wind individual frames of a filmstrip into a take-up chamber after each frame is exposed, and a frame counter rotatable to indicate how many frames are left to be exposed, is characterized in that a locking device is movable to secure the film winder and the frame counter in place to prevent their further rotation responsive to the frame counter being rotated to indicate there are no frames left to be exposed.

7 Claims, 6 Drawing Sheets

5,652,933

CAMERA WITH LOCKING DEVICE FOR SECURING FILM WINDER AND FRAME COUNTER AFTER COMPLETED FILM USE

CROSS-REFERENCE TO RELATED APPLICATION

Reference is made to commonly assigned copending application Ser. No. 08/569,054, entitled APPARATUS AND METHOD FOR LOADING AND PARTIALLY UNLOADING A CAMERA WITH A DISCRETE FILM STRIP and filed Dec. 8, 1995 in the names of William A. Bergstresser, Eric P. Hochreither, Dennis R. Zander and Bradley S. Bush.

The cross-referenced application is incorporated in this application.

FIELD OF THE INVENTION

The invention relates to the field of photography, and in particular to photographic cameras. More specifically, the invention relates to a camera with a locking device for securing a film winder and a frame counter to prevent their operation after completed film use.

BACKGROUND OF THE INVENTION

It is well known for a camera to have a film winder rotatable to wind individual frames of a filmstrip into a take-up chamber after each frame is exposed, and a frame counter rotatable to indicate how many frames are left to be exposed.

SUMMARY OF THE INVENTION

A camera comprising a film winder rotatable to wind individual frames of a filmstrip into a take-up chamber after each frame is exposed, and a frame counter rotatable to indicate how many frames are left to be exposed, is characterized in that:

locking means is movable to secure the film winder and the frame counter in place to prevent their further rotation responsive to the frame counter being rotated to indicate there are no frames left to be exposed.

Preferably, an ingress hole is located to access the locking means to move the locking means to release the film winder and the frame counter.

DETAILED DESCRIPTION OF THE INVENTION

Figure 1:
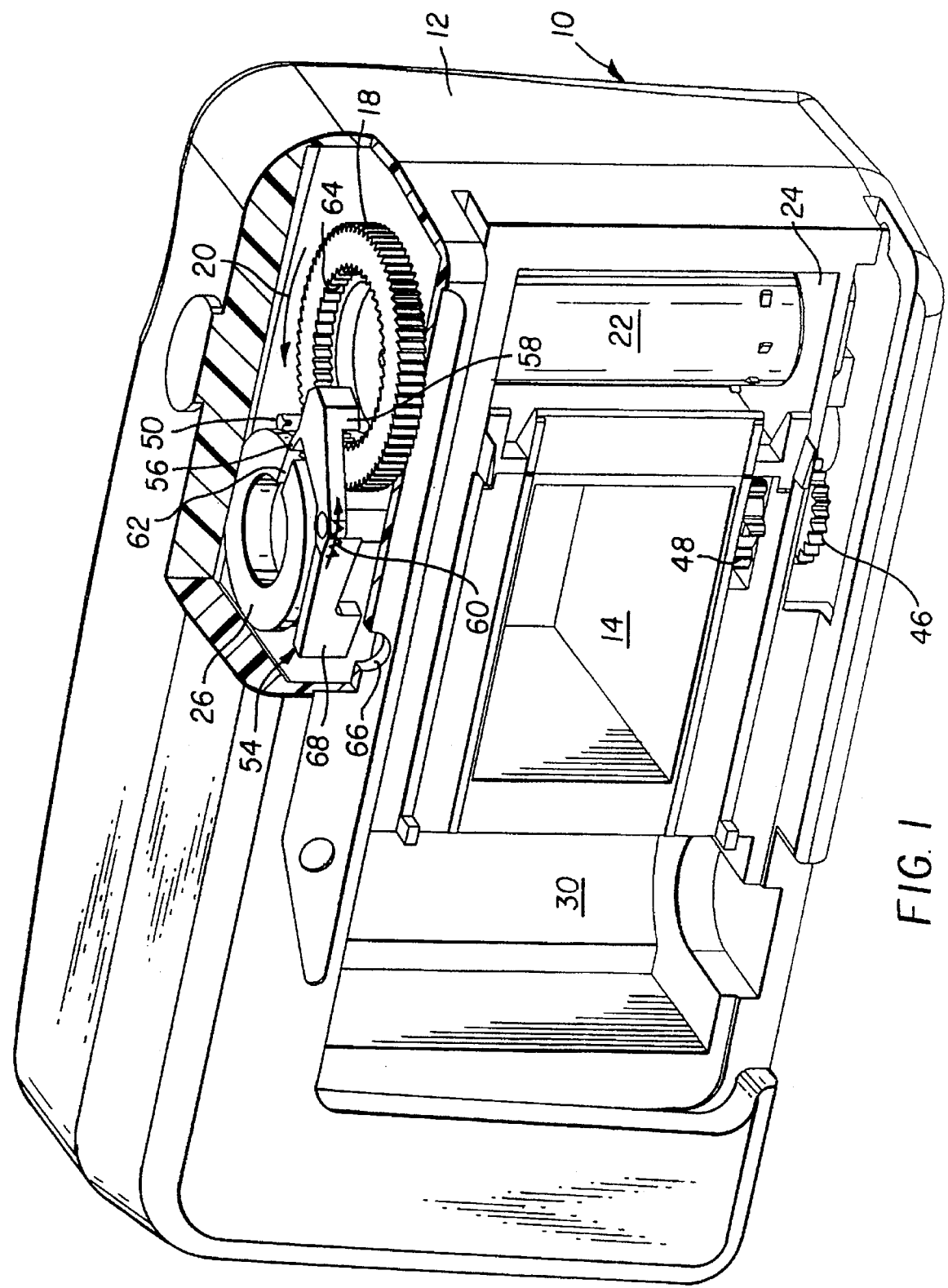
FIG. 1 is a rear perspective view of a camera with a locking device for securing a film winder and a frame counter after completed film use according to a preferred embodiment of the invention, showing a top portion of the housing of the camera partially cut away and the back removed to illustrate the locking device, the film winder and the frame counter.
Figure 2:
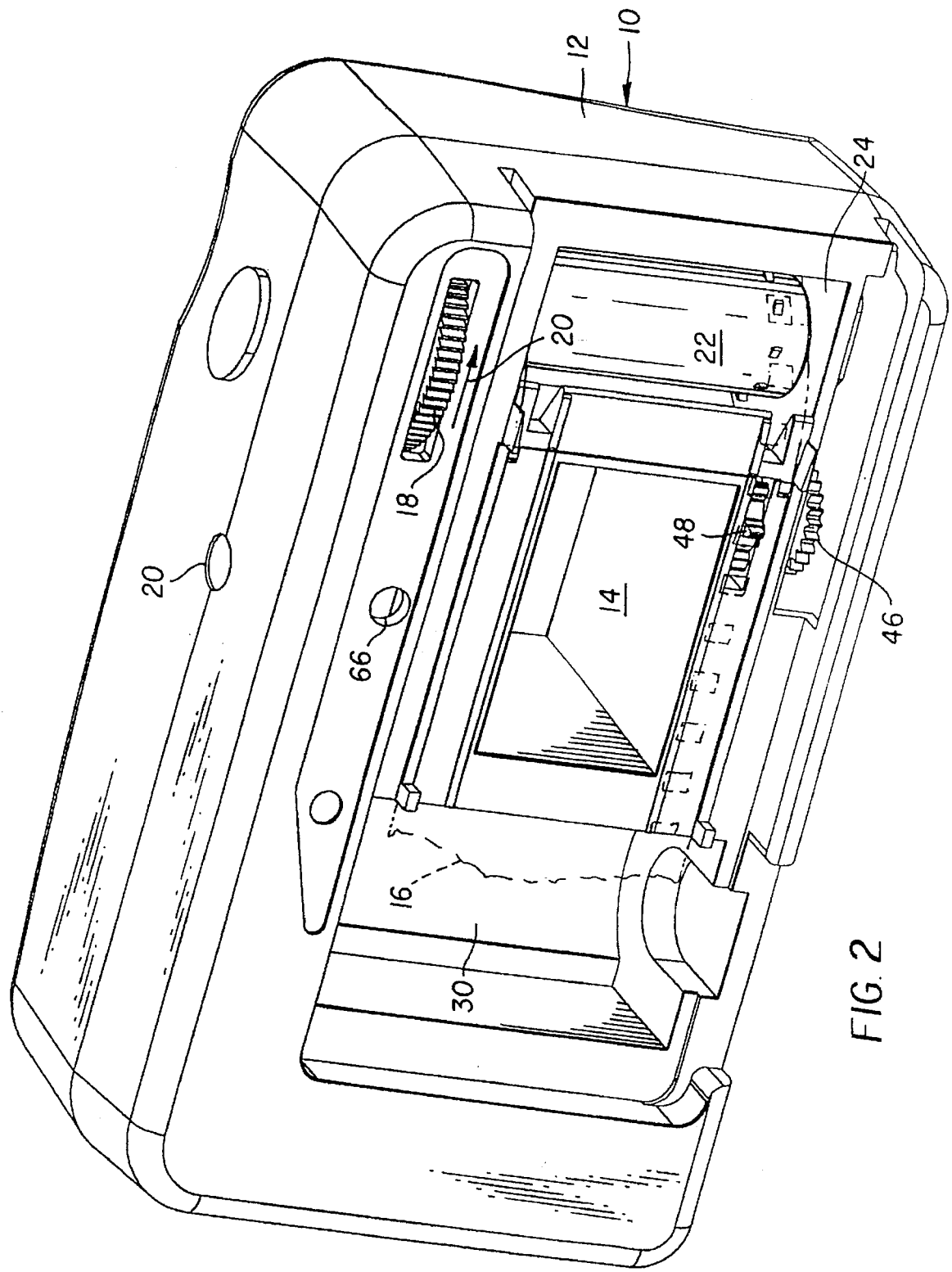
FIG. 2 is a rear perspective view of the camera only with the back removed.
Figure 3:
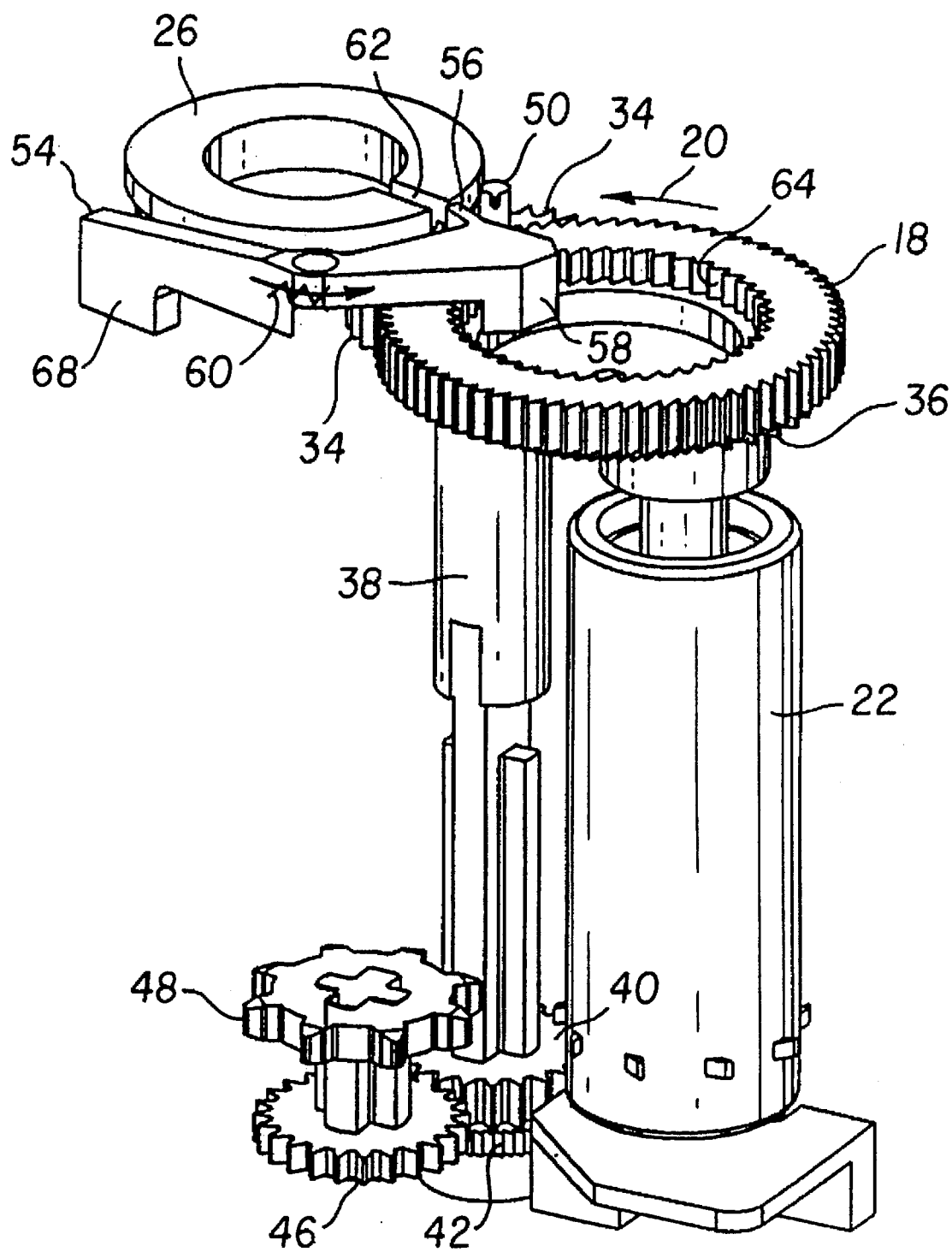
FIG. 3 is a top perspective view of the locking device, the film winder and the frame counter.

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a camera 10 having a body 12 which contains or supports an interior backframe opening 14 at which successive frames of a filmstrip 16 are exposed, a ring-shaped film wind thumbwheel 18 manually rotatable in a film winding direction 20 to wind individual frames of the filmstrip onto a film take-up drum 22 in a film take-up chamber 24 after each film frame is exposed at the backframe opening, and a ring-shaped frame counter 26 rotatable beneath an exterior counter window 28 to provide a current number-indication "24"-"0" of how many film frames are left to be exposed. The filmstrip 16, when unexposed, is initially stored in a film roll chamber 30.

Figure 4:
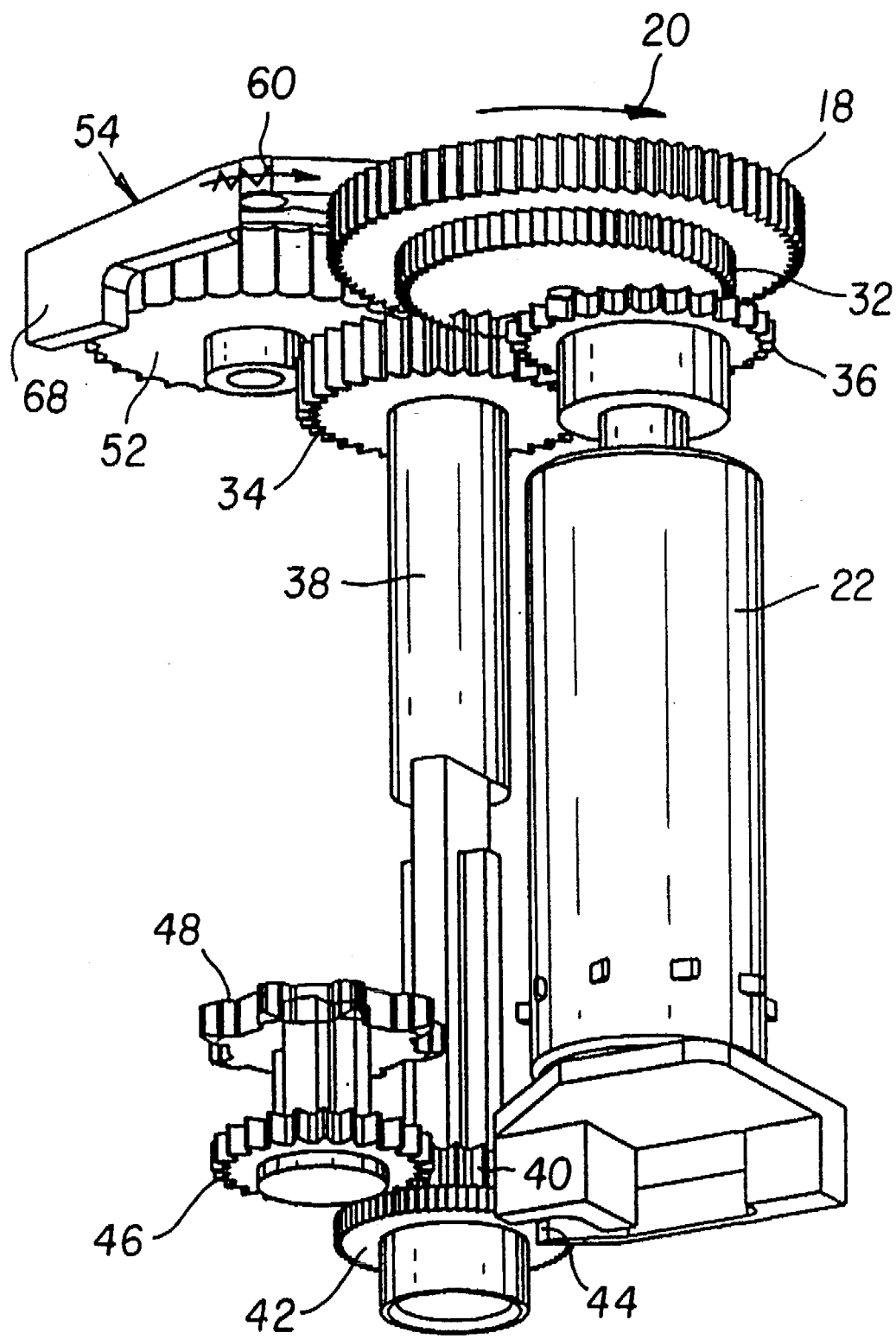
FIG. 4 is a bottom perspective view of the locking device, the film winder and the frame counter.

As shown in FIG. 4, the thumbwheel 18 has a coaxial gear 32 coaxially fixed to its underside which is in mesh with an intermediate gear 34 which, in turn, is in mesh with a drum gear 36. The drum gear 36 is coaxially fixed to the take-up drum 22 to make manual rotation of the thumbwheel 18 in the film winding direction 20 similarly rotate the take-up drum (via the coaxial gear 32, the intermediate gear 34 and the drum gear), to wind individual frames of the filmstrip 16 onto the take-up drum after each film frame is exposed at the backframe opening 14.

The intermediate gear 34 is coaxially fixed to a shaft 38 which, in turn, is coaxially fixed to a drive gear 40 and an anti-backup gear 42. See FIGS. 3 and 4. An anti-backup pawl 44 engages the anti-backup gear 42 to prevent counter-rotation of the shaft 38. The drive gear 40 is in mesh with a sprocket gear 46 which is coaxially fixed to a film metering sprocket 48. The film metering sprocket 48 is rotated in engagement with the filmstrip 16 in the film winding direction 20 (via the coaxial gear 32, the intermediate gear 34, the shaft 38, the drive gear 40 and the sprocket gear 46) responsive to manual rotation of the thumbwheel 18 in the same direction. A known film metering mechanism, not shown, arrests the shaft 38 each time the filmstrip 16 is advanced a single frame increment from the film roll chamber 30 to the film take-up chamber 24 in order to limit rotation of the thumbwheel 18 and the sprocket 48 in the film winding direction 20.

Figure 5:
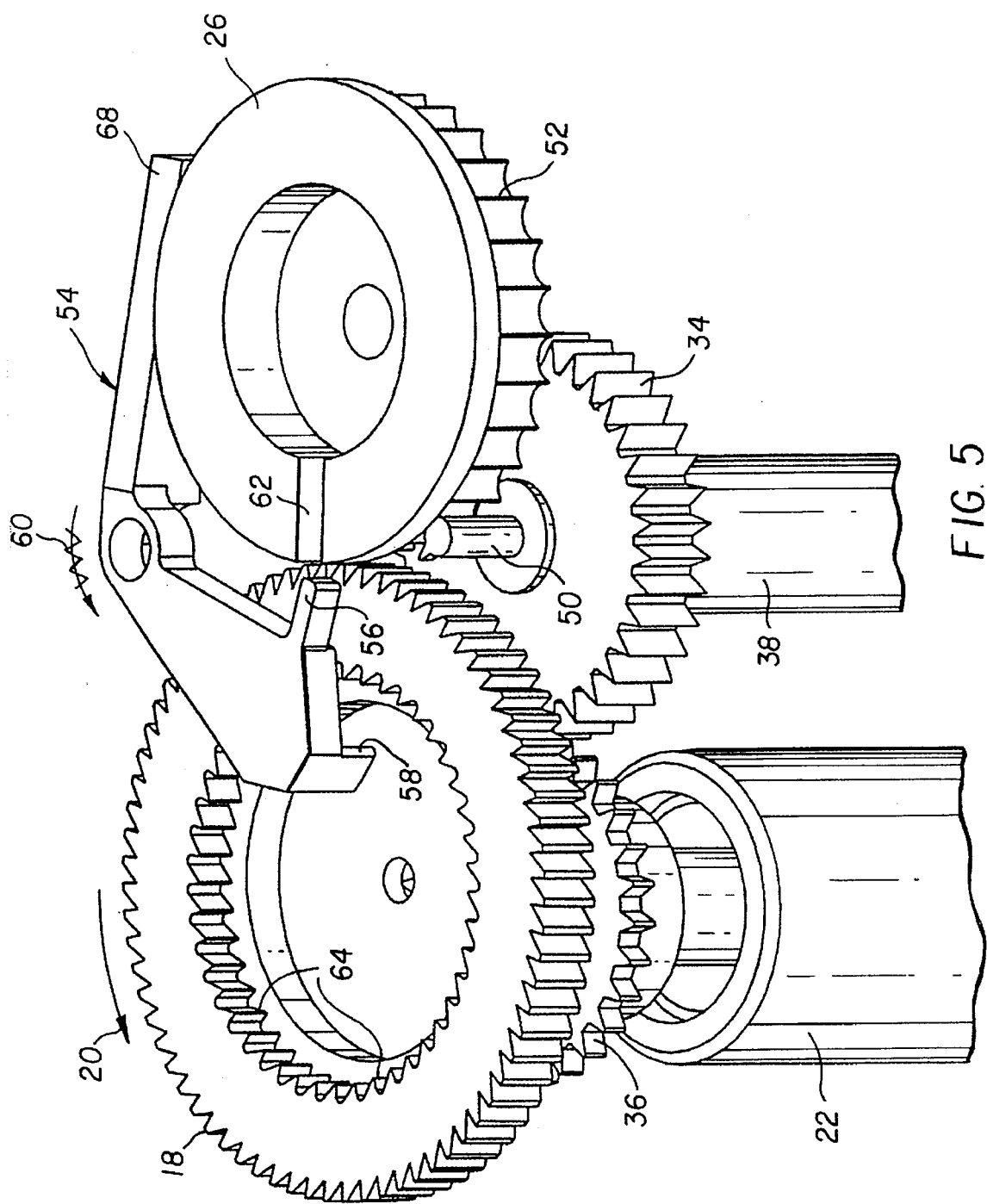
FIGS. 5 and 6 are partial perspective views of the locking device, the film winder and the frame counter as seen from a reverse side when compared with FIG. 3, showing the locking device in a non-locking or release position in FIG. 5 and in a locking position in FIG. 6.

A drive pawl 50 is coaxially fixed atop the intermediate gear 34, as shown in FIG. 5, for continuous rotation with that gear. The drive pawl 50 is located adjacent a counter gear 52 coaxially fixed to the frame counter 26. Each time the thumbwheel 18 is manually rotated in the film winding direction 20, the drive pawl 50 is oppositely rotated (via the coaxial gear 32 and the intermediate gear 34) to periodically engage the counter gear 52 to rotate the frame counter 26 in the same direction as the thumbwheel beneath the counter window 28 to provide the next number-indication of how many film frames are left to be exposed.

Figure 6:
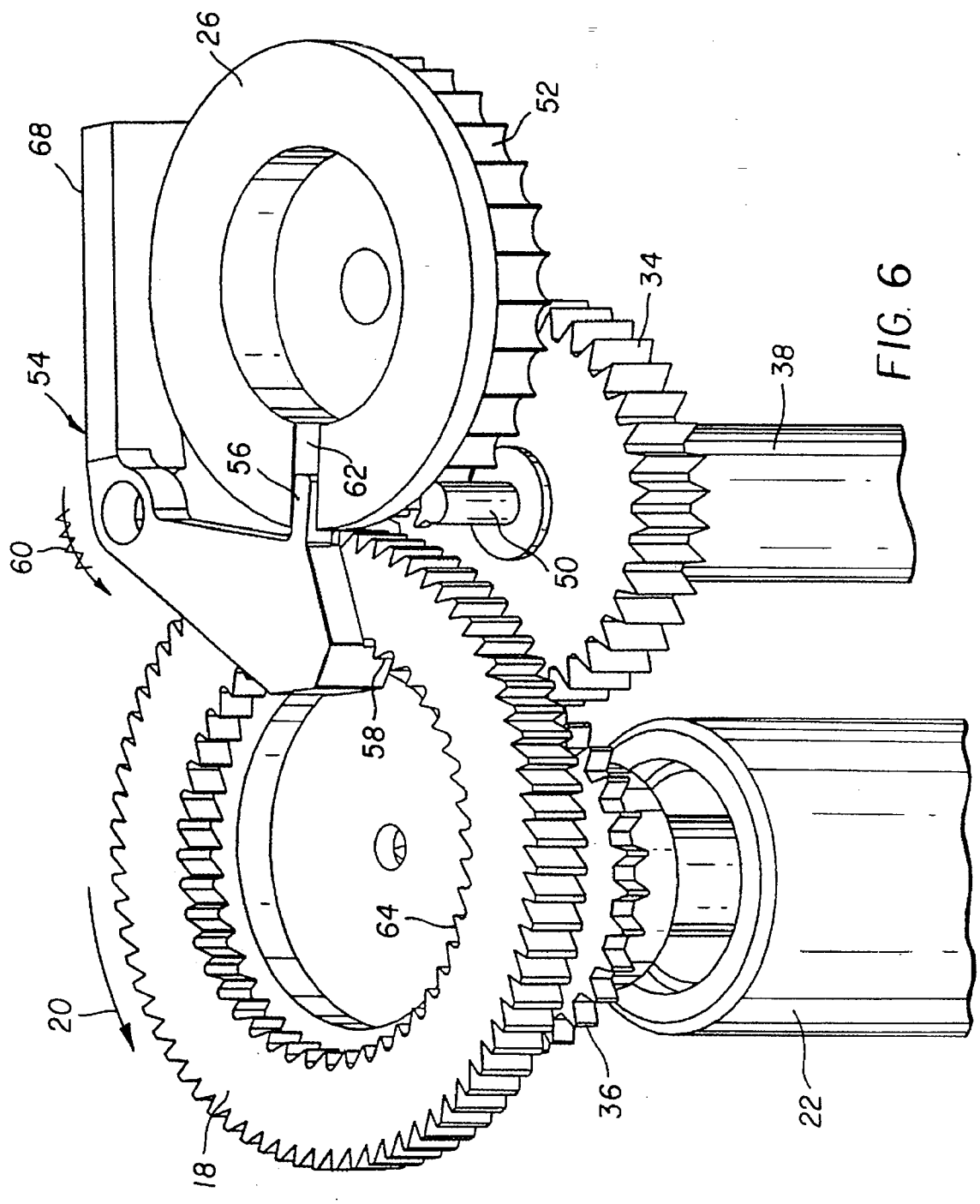

A pivotal locking lever 54 has first and second locking pawls 56 and 58. A torsion spring 60 biases the locking lever 54 in a counter-clockwise direction in FIGS. 1 and 3 to maintain the first locking pawl 56 against an outer periphery of the frame counter 26. When the frame counter 26 is rotated beneath the counter window 28 to provide a number-indication, i.e. "0", that there are no film frames left to be exposed, a single cut-out 62 in the outer periphery of the frame counter is positioned opposite the first locking pawl 56 as shown in FIG. 5. This permits the spring 60 to pivot the locking lever 54 to move the first locking pawl 56 into the cut-out 62 to secure the frame counter 26 in place to prevent its further rotation. At the same time, the second locking pawl 58 is moved into any one of a continuous series of notches 64 in an inner periphery of the thumbwheel 18 to secure the thumbwheel in place to prevent its further rotation. See FIG. 6.

An exterior ingress hole 66 is located opposite a lever arm 68 of the locking lever 54 to permit an insertion tool, such as a screw driver, to be inserted through the hole. See FIGS. 1 and 2. The tool is used to push the lever arm 68 to pivot the locking lever 54 contrary to the urging of the spring 60, to retract the first locking pawl from the cut-out 62 and to retract the second locking pawl 58 from one of the notches 64.

The invention has been described with reference to a preferred embodiment. However, it will be appreciated that variations and modifications can be effected by a person of ordinary skill in the art without departing from the scope of the invention.

PARTS LIST 10. camera
12. body
14. backframe opening
16. filmstrip
18. film wind thumbwheel
20. film winding direction
22. film take-up drum
24. film take-up chamber
26. frame counter
28. counter window
30. film roll chamber
32. coaxial gear
34. intermediate gear
36. drum gear
38. shaft
40. drive gear
42. anti-backup gear
44. anti-backup pawl
46. sprocket gear
48. film metering sprocket
50. drive pawl
52. counter gear
54. locking lever
56. first locking pawl
58. second locking pawl
60. torsion spring
62. cut-out
64. notches
66. ingress hole
68. lever arm

I claim:

1. A camera comprising a film winder rotatable to wind individual frames of a filmstrip into a take-up chamber after each frame is exposed, and a frame counter rotatable to indicate how many frames are left to be exposed, is characterized in that:

a single locking lever has first and second separate locking pawls;

said frame counter has a single engageable means positioned for engagement with said first locking pawl to secure the frame counter in place responsive to said frame counter being rotated to indicate there are no frames left to be exposed; and said film winder includes a plurality of engageable means any one of which can be positioned for engagement with said second locking pawl when said single engageable means is positioned for engagement with said first locking pawl.

2. A camera as recited in claim 1, wherein a spring urges said locking lever to move said first locking pawl to engage said single engageable means and to move said second locking pawl to engage one of said plurality of engageable means when the respective engageable means are positioned for engagement with the first and second locking pawls.

3. A camera as recited in claim 1 wherein said frame counter is ring-shaped and has a single peripheral cut-out which defines said single engageable means, and said film winder includes a manual film wind thumbwheel that is ring-shaped and has a continuous series of inner facing notches which define said plurality of engageable means.

4. A camera as recited in claim 1 wherein a metering sprocket is rotationally coupled with said film winder to be rotated in engagement with the filmstrip when the film winder is rotated to wind individual frames into said chamber and to be secured in place to prevent it from being further rotated in engagement with the filmstrip when the film winder and said frame counter are secured in place.

5. A camera as recited in claim 1, wherein an ingress hole is located to access said locking lever to move the first and second locking pawls to release said film winder and said frame counter.

6. A camera as recited in claim 1, wherein a drive pawl is continuously coupled with said film winder and is periodically coupled with said frame counter to rotate the frame counter incrementally to indicate how many frames are left to be exposed when the film winder is rotated to wind individual frames into said chamber and to be secured in place to prevent it from being further rotated when the film winder and the frame counter are secured in place.

7. A camera comprising a film winder rotatable to wind individual frames of a filmstrip into a take-up chamber after each frame is exposed, and a frame counter rotatable to indicate how many frames are left to be exposed, is characterized in that:

locking means is movable to secure said film winder and said frame counter in place to prevent their further rotation responsive to the frame counter being rotated to indicate there are no frames left to be exposed; and an ingress hole is located to access said locking means to move the locking means to release said film winder and said frame counter.

* * * * *